Patented July 12, 1949

2,475,953

UNITED STATES PATENT OFFICE 2,475,953

METHOD OF STABILIZING CELLULOSE ESTERS AND THE PRODUCTS THEREOF

William M. Gearhart and Thomas S. Gardner, Kingsport, Tenn., assignors to Eastman Kodak Company, Rochester, N. Y., a corporation of New Jersey No Drawing. Application October 3, 1945, Serial No. 620,160

10 Claims. (Cl. 106—178)

Our invention relates to the stabilizing of cellulose ester plastics which have been decolored with hydrogen peroxide which comprises adding thereto a small proportion of a compatible unsaturated organic compound having readily accessible double bonds.

When plastic compositions are prepared using cellulose organic acid esters, ordinarily the cellulose ester is mixed with plasticizer at an elevated temperature such as on hot rolls or in mixing vessels to give a homogeneous composition. It has been found that mixing of a small amount of hydrogen peroxide with the plastic at this point materially improves its color and heat stability providing the resulting product is washed to remove any oxidation products formed by the peroxide, and any excess peroxide which may be present.

One object of our invention is to provide a method for the treatment of the plastic whereby the washing operation may be dispensed with. Another object of our invention is a bleached cellulose ester plastic which is capable of withstanding a temperature of 205° C. for 1 hour. Other objects of our invention will appear herein.

We have found that the plastic material formed by mixing together a cellulose organic acid ester, a saturated plasticizer and hydrogen peroxide can without the difficulties attendant upon washing, be stabilized against the effects of heat and of storage, if a small proportion of an unsaturated organic compound which is compatible with the composition is incorporated therein. The unsaturated compounds which we have found to be most suitable are these unsaturated organic esters such as maleates, fumarates, acrylates, crotonates or esters of unsaturated alcohols such as allyl esters, which have been employed to plasticize cellulose esters. These compounds will be referred to as "unsaturated plasticizers" herein even though the plasticization of the cellulose ester is obtained by a saturated plasticizer, these unsaturated plasticizers here performing another function. Some of these unsaturated compounds are excellent plasticizers while others are poorly adapted for that purpose. The effectiveness of those compounds in the present invention is not related to their comparative value for plasticizing purpose.

Our invention is useful generally for stabilizing cellulose ester plastic compositions which have been bleached with hydrogen peroxide, whether the esters thereof are cellulose acetates or mixed organic acid esters of cellulose, particularly those esters having acyls of 2-4 carbon atoms, such as cellulose acetate propionate or cellulose acetate butyrate having a propionyl or butyryl content of at least 35%.

The unsaturated plasticizers generally have been found to be useful in our invention, some of the compounds of this type being more effective than others, the effectiveness being a factor in determining the amount to use. The effectiveness of these compounds is dependent on the accessibility of the double bond. Terminal groups such as found in styrene are quite effective. Compounds having slightly less accessible double bonds such as the crotonates are in general correspondingly less effective. With compounds such as the oleates where the double bond is in the center of a long aliphatic chain, effectiveness requires rather drastic conditions. Sometimes effectiveness is enhanced by conjugation of double bonds such as in the maleate esters where two carbonyl groups enhance the activity of the centrally located double bond. The unsaturated compounds which have shown the most effectiveness are those which are capable of forming polymers. The amount of unsaturate, the temperature and time of reaction needed are less with increase of effectiveness of the unsaturated plasticizer.

Representative of unsaturated plasticizers and typical of the compounds which are suitable for use in our invention, as described, are as follows: the maleates such as methoxyethyl maleate, butoxy ethyl maleate, dibenzyl maleate, di-2-ethyl hexyl maleate, and di-ethoxy ethyl maleate, the crotonates such as the glyceryl tri- and dicrotonates, and ethylene glycol dicrotonate, acrylic acid esters such as butoxy ethyl acrylate, methacrylates such as methyl methacrylate, styrene and allyl esters such as allyl phthalate, allyl myristate, allyl sebacate, allyl stearate and the like.

The plastic which is treated in accordance with our invention is first formed by mixing a cellulose organic acid ester with a saturated plasticizer. In the case of cellulose acetate some of the plasticizers which may be employed are glyceryl triproprionate, dimethyl phthalate, diethyl phthalate, triphenyl phosphate or any of the plasticizers commonly employed in the cellulose acetate plastics art. In the case of a high butyryl cellulose ester, some of the plasticizers which are useful are: dibutyl sebacate, dibutyl phthalate, di-2-ethyl hexyl phthalate, methyl stearate, dibutyl adipate or any of the plasticizers commonly employed in the cellulose acetate butyrate plastics art. Prior art disclosures of suitable saturated plasticizers to employ in the making of cellulose ester plastics are to be understood as being a part of this disclosure.

The treatment of the plastic with hydrogen peroxide may be carried out on the rolls upon which the cellulose ester and saturated plasticizer are mixed. The peroxide treatment may also be carried out in a mixer at the same time that the cellulose ester and plasticizer are being mixed. The peroxide treatment is most conveniently carried out by emulsifying the saturated plasticizer, in an aqueous solution of a wetting agent in which hydrogen peroxide is incorporated. The emulsion so formed is then thoroughly mixed with the cellulose ester. For example the cellulose ester and the emulsion may be mixed together in a mixer until homogeneity is attained. Then a compatible unsaturated compound having an accessible double bond is added and thoroughly mixed into the composition. The resulting mixture is then worked up on hot rolls to a slab of plastic which may be powdered, cut into granules or strips or comminuted as desired. A product is obtained which is free of objectionable color and will tolerate the heat of compounding and of the molding press without going off color.

In our opinion, the aliphatic double bond absorbs any residual oxygen resulting from the hydrogen peroxide treatment, forming an epoxy compound in place of the oxygen-loaded compounds which may be present. Also if any free or loosely-held sulfuric acid is present it is readily taken up by the aliphatic double bond of the unsaturated compound added, thus contributing to the stability of the plastic composition.

The amount of unsaturated compound added in accordance with our invention is ordinarily only approximately sufficient to react with the residual oxygen which is present in the plastic after the peroxide treatment. In some cases a small excess may be incorporated to guarantee that sufficient unsaturate is employed. This, however, has no substantial effect on the plasticization of the cellulose ester, the saturated plasticizer being principally depended on for that purpose. The presence of a few per cent of unsaturated plasticizer however, as a hold over from the oxygen absorption treatment will not be detrimental to the plastic itself. The amount of saturated plasticizer employed should be sufficient to cause the plastic composition to have the desired flow temperature. In the case of cellulose acetate butyrate the amount of saturated plasticizer added should reduce the flow temperature to less than 315° F. (the ester itself having a flow temperature of 350–360° F.) In the case of cellulose acetate the amount of saturated plasticizer added should reduce the flow temperature to at least 340° F. or less. The use of as large an amount of saturated plasticizer as possible for a given flow is preferred as this permits greater covering and penetration of the cellulose ester particles and from this results better bleaching action.

The following examples illustrate the preparation of stable peroxide bleached cellulose ester plastics embodying our invention:

*Example I*

100 parts of cellulose acetate was placed in a mixer and an emulsion of 30 parts of glyceryl tripropionate and 1 part of 30% $H_2O_2$ in an aqueous solution of a wetting agent, capryl sodium phosphate, known in the trade as W. A. 58, was placed therein. Mixing was continued for 3 hours at 70° C. Then 10 parts of glyceryl tricrotonate was added and thoroughly mixed into the mass. The material stood a few hours and was then rolled and pressed. The plastic was stable to heat and flow breakdown as shown by heating for 1 hour at 205° C. The resulting material also had a low heat test color.

*Example II*

A mixture of cellulose acetate and an emulsion containing glyceryl tripropionate and $H_2O_2$, of the same character as in the preceding example, was placed in a Day mixer and was mixed together for 3 hours at 65° C. There was then added 10 parts of ethoxyethyl maleate and the mass was mixed for 2 hours while allowing cooling to room temperature. The batch was then processed on a hot milling roll. A plastic having very low color and excellent heat stability was obtained.

*Example III*

A mixture of cellulose acetate and emulsion as in the preceding examples was mixed for 6 hours in a Day mixer at room temperature and then was allowed to stand for 70 hours at room temperature. 2 parts of styrene was thoroughly mixed in and the batch was processed on the hot roll. The resulting plastic material had a very low color and excellent heat stability.

*Example IV*

100 parts of cellulose acetate butyrate having a butyryl content of 38% was mixed with an emulsion consisting of 8 parts of dibutyl sebacate, 3 parts of $H_2O_2$ (30% solution) and 50 cc. of a 50% solution of capryl sodium phosphate (W. A. 58) in a Day mixer at 80–90° C. for 2 hours. 3 parts of allyl stearate was then added and the mixing was continued for 2 hours more. The batch was processed on hot rolls to give a plastic slab free of color and heat stable.

*Example V*

The same formula as in the preceding example was compounded at room temperature and let stand for 75 hours. 5 parts of allyl stearate was added and the batch was processed on hot rolls. A bleached, heat-stable plastic was obtained.

We claim:

1. A method of preparing a bleached, heat-stable plastic composition which comprises mixing a cellulose organic acid ester with a saturated plasticizer and aqueous hydrogen peroxide and without washing the mass incorporating therein styrene.

2. A method of preparing a bleached, heat-stable plastic composition which comprises mixing a cellulose organic acid ester with a saturated plasticizer and aqueous hydrogen peroxide and without washing the mass incorporating therein a crotonic acid ester.

3. A method of preparing a bleached, heat-stable plastic composition which comprises mixing a cellulose organic acid ester with a saturated plasticizer and aqueous hydrogen peroxide and without washing the mass incorporating an ester of allyl alcohol therein.

4. A method of preparing a bleached, heat-stable plastic composition which comprises mixing a cellulose acetate butyrate with a saturated plasticizer and aqueous hydrogen peroxide and without washing the mass incorporating therein an unsaturated organic compound containing only C, H, and O and having carbon to carbon aliphatic double bonds.

5. A method of preparing a bleached, heat-stable plastic composition which comprises mixing with a cellulose acetate butyrate an aqueous emulsion containing a saturated plasticizer and aqueous hydrogen peroxide and without washing the mass incorporating in that mixture a small proportion of an unsaturated organic compound containing only C, H, and O and having carbon to carbon aliphatic double bonds.

6. A method of preparing bleached, heat-stable plastic compositions which comprises mixing cellulose esters of fatty acids of 2-4 carbon atoms with saturated plasticizer and aqueous hydrogen peroxide and without washing the mass incorporating therein an unsaturated organic compound containing only C, H, and O and having carbon to carbon aliphatic double bonds.

7. A stable cellulose ester plastic composition essentially consisting of a cellulose ester of fatty acids of 2-4 carbon atoms, a saturated plasticizer, and an unsaturated aliphatic compound containing only C, H, and O and having a carbon to carbon double bond therein.

8. A stable cellulose ester plastic composition essentially consisting of cellulose acetate butyrate, a saturated plasticizer, and an unsaturated aliphatic compound containing only C, H, and O and having a carbon to carbon double bond therein.

9. A stable cellulose ester plastic composition essentially consisting of cellulose acetate butyrate, dibutyl sebacate, and an unsaturated aliphatic compound containing only C, H, and O and having a carbon to carbon double bond therein.

10. A stable cellulose ester plastic composition essentially consisting of cellulose acetate butyrate, dibutyl sebacate, and an ester of allyl alcohol.

WILLIAM M. GEARHART.
THOMAS S. GARDNER.

REFERENCES CITED

The following references are of record in the file of this patent:

UNITED STATES PATENTS

| Number | Name | Date |
| --- | --- | --- |
| 1,898,363 | Greenbank | Feb. 21, 1933 |
| 1,938,999 | Cox | Dec. 12, 1933 |
| 2,109,593 | Macht | Mar. 1, 1938 |
| 2,158,724 | Kilgore | May 16, 1939 |
| 2,355,330 | Rehberg | Aug. 8, 1944 |